Figure 1:
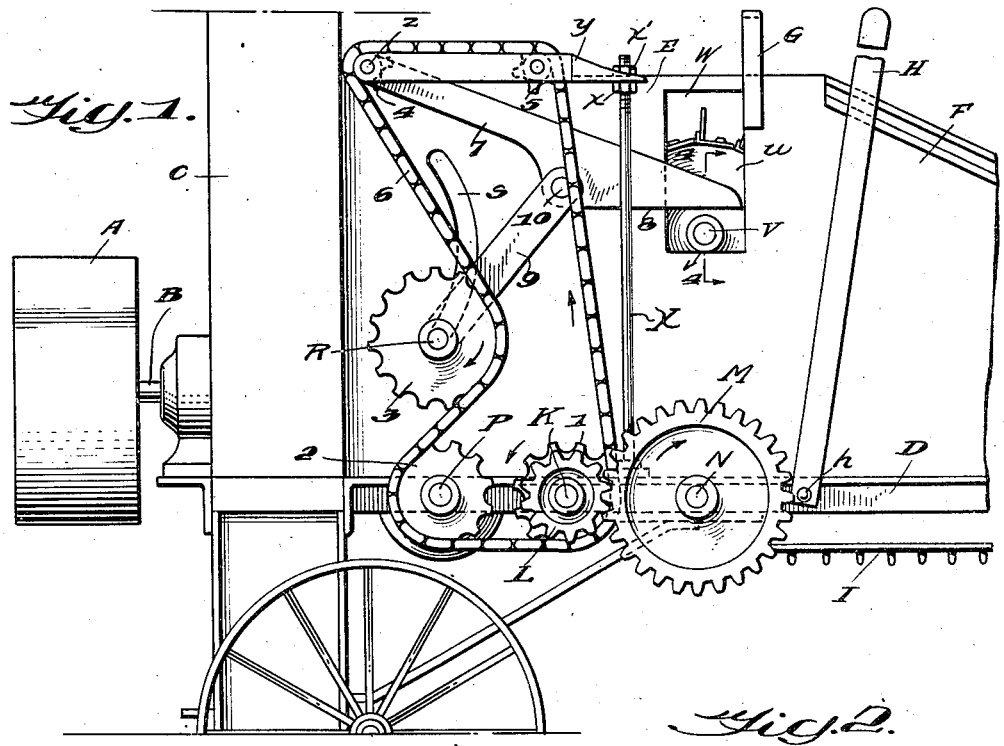

Inventor
MILES L. SENSENIG,
By Babcock & Babcock
Attorneys

June 25, 1946.   M. L. SENSENIG   2,402,849
FEED MEANS AND DRIVING MECHANISM THEREFOR
Filed Jan. 18, 1945    2 Sheets-Sheet 2

Inventor
MILES L. SENSENIG,
By Babcock + Babcock
Attorneys

Patented June 25, 1946

2,402,849

UNITED STATES PATENT OFFICE 2,402,849

FEED MEANS AND DRIVING MECHANISM THEREFOR

Miles L. Sensenig, Lancaster, Pa., assignor to Dellinger Manufacturing Company, Lancaster, Pa., a corporation of Pennsylvania Application January 18, 1945, Serial No. 573,428

6 Claims. (Cl. 198—164)

This invention relates to feed means and driving mechanism therefor for various pieces of farm machinery or equipment primarily, such for instance as ensilage or straw cutters or other equipment wherein the raw roughage material, such as corn, corn fodder, grass hay, pea vines, limp grass, alfalfa hay and other roughage material is dumped upon or fed to a traveling belt table or other conveyer and carried by the latter to the feed rolls or means which grasp it from the feed table or conveyer and feed it between them to the cutter or chopper or other processing machinery.

In such equipment it is usual and known to mount the lower feed roll for rotation about a fixed axis and the upper feed roll or a portion of the upper feed means so that it will move upward and downward away from or toward the fixed feed roll to accommodate the varying thicknesses of the mass or layer or roughage material being fed.

The primary objects of the present invention are to provide positive means, distinct from the immediate upward thrust of the roughage material on the upper main feed roll or chopper end portion of the upper unitary feeding means, and acting in opposition to the downward pull of the sprocket drive chain for raising the upper main feed roll or chopper end portion of the upper feeding means to accommodate increased thicknesses in the layer of material being fed; to safeguard the sprocket drive chain against being subjected to excessive tensions or strains; to provide an unitary upper feed means having front and rear rolls mounted on shafts maintained in parallel relation and at a fixed distance to each other with the end portions of their respective shafts disposed in substantially vertically extending slots or guided by substantially vertical or vertically extending guide means with said rolls having means for rotating them in the same direction, preferably by means of an endless upper feed band or apron, in combination with a lever and link means whereby the upward thrust of one of said rolls will move said lever and link and positively pull the other end of said upper unitary feed means together with the main upper feed roll carried thereby upward away from the lower feed roll; to provide such a combination wherein the respective upper feed rolls may rise and fall in various phases of the feeding operation independently of each other so that the upper feed means may at all times accommodate itself to the inequalities or humps and depressions of the upper surface of the material being fed and may feed with equal facility the entire range of roughage material utilized in the preparation of various feeds for livestock or poultry or both; to simplify the drive means of such feed mechanism; and to reduce the cost of manufacture of such equipment and also the cost of maintenance thereof.

Figure 2:
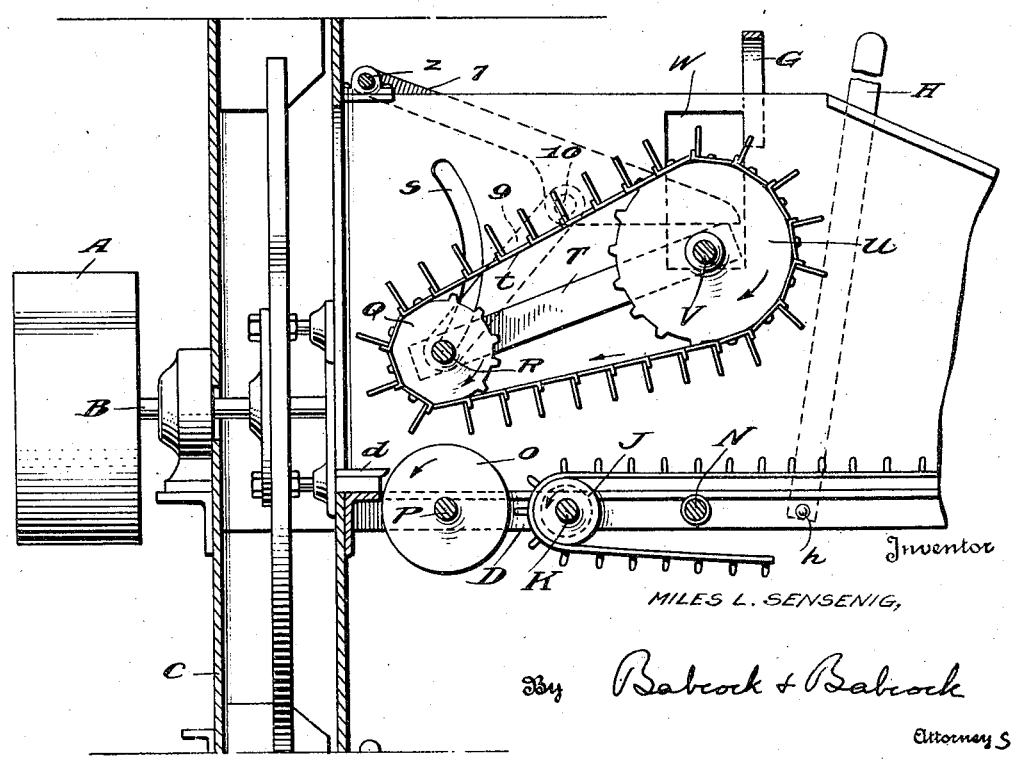
Figure 3:
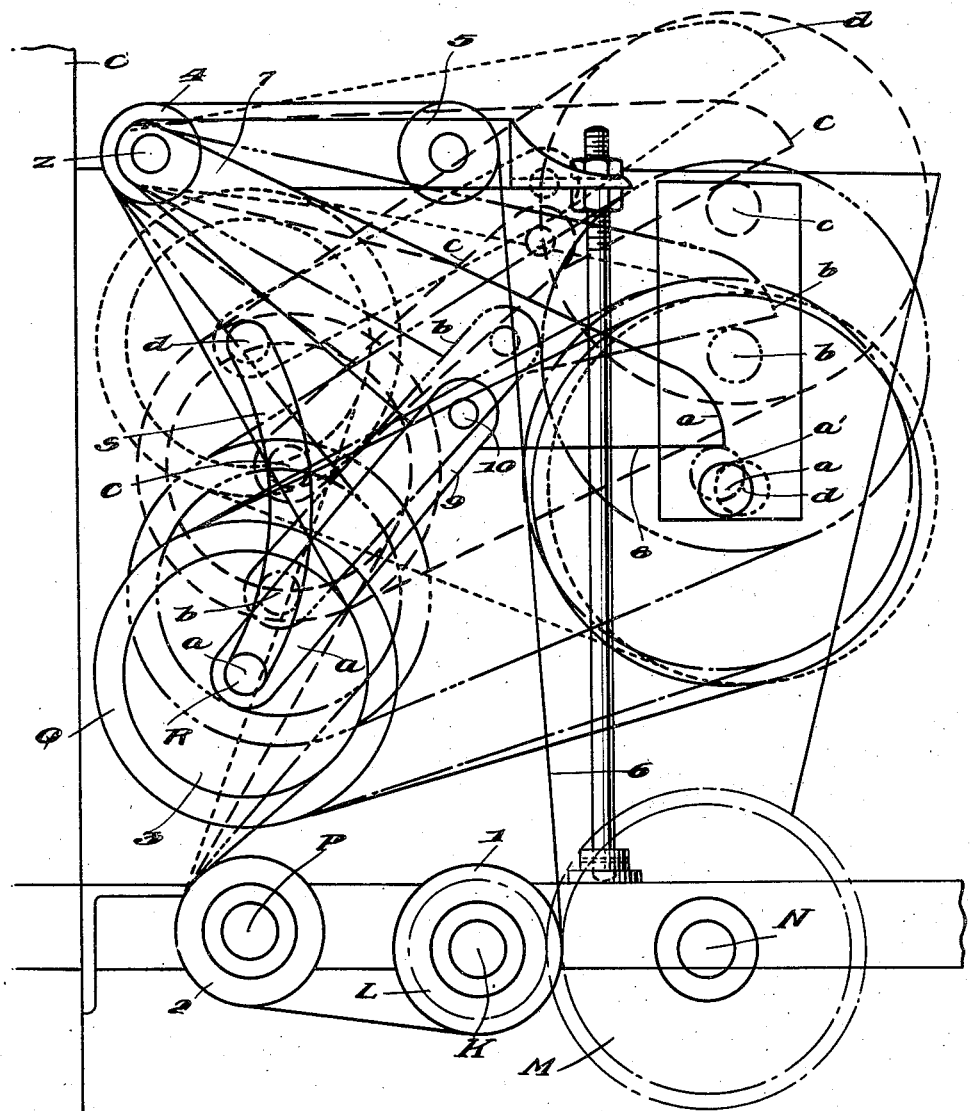
Figure 4:
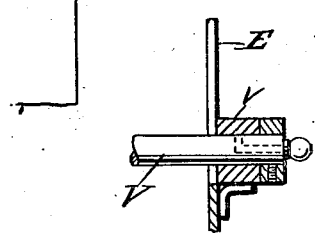

In the accompanying drawings:

Figure 1 represents a side elevation of a portion of an ensilage cutter embodying my invention;

Figure 2, a longitudinal sectional view thereof;

Figure 3, a diagrammatic view illustrating by light solid lines, heavy dot and dash lines, light dot and dash lines and dotted lines the different positions, by way of examples, that the parts will take throughout their range of movement, the several different positions illustrated simply being arbitrarily selected for purposes of comparison; and Figure 4, a fragmentary detail sectional view on the line 4—4 of Figure 1, showing the construction and mounting of the bearing sleeves or collars $v$ on the end portions of the shaft V.

Referring now in detail to the drawings, A designates a main drive pulley to be driven by a belt, not shown, in turn driven by any suitable means such as a tractor, not shown, said pulley A being mounted upon a shaft B for rotation therewith to rotate the combined cutter and exhaust fan disc secured to said shaft B to rotate therewith in the housing C from which the cut or chopped material is delivered or exhausted through the usual delivery spout, not shown. Said shaft B is mounted in suitable bearings secured to the frame D and in addition to driving the cutter and exhaust disc as mentioned, it also serves to drive through suitable shafting and gearing connections, not shown, the shaft N and gear wheel M, which meshes with gear wheel L keyed to shaft K on which is mounted to turn therewith the rear roll J of the main feed table or lower apron I, said shafts N and K turning in opposite directions and in the directions of the respective arrows to cause the upper flight of the table or lower apron I to travel toward the cutter.

E designates the sides of the feeding box secured in any usual suitable known manner, as by welding, to the frame D and similarly connected respectively to the respective side plates F which may be similarly secured to the frame D and preferably braced and tied together by means of a strap G of elongated U-shape similarly connected to the metal box sides.

O designates the lower main feed roll keyed to the shaft P which in turn is mounted in suitable bearings, not shown, on or in the frame D.

Q designates the upper rear or main feed roll which is driven by the sprocket chain 6 to rotate in the direction of the arrow and is keyed to the shaft R, the end portions of which extend into or through the vertically disposed arcuate slots S in the respective sides E of the box for vertical and slight endwise movement therein in accordance with the variations in the thickness of the layer of roughage material being handled, the respective end portions of the shaft R being journaled in the rear end portions of a pair of rigid preferably metal bars T, in the respective front end portions of which are journaled the end portions of the front or supplementary upper feed roll shaft V to which is preferably keyed, or otherwise secured thereto to turn therewith, the front or supplementary upper feed roll U. The respective end portions of said shaft V extend laterally through the vertical slots W respectively and carry bearing sleeves or collars $v$ to lie beneath the edge faces 8 respectively of the respective levers 7 so as to press against said faces and lift said levers or swing them upward about their fulcrum or pivotal points, that is to say about the axis of the shaft or rod Z on which they are mounted for free swinging movement. The slots W are of sufficient width to permit the shaft V together with shaft R to have a limited movement endwise of the cutter box or ensilage cutter or machine as the shaft R moves through the vertically disposed arcuate path in the vertically extending arcuate slots S, and is confined between the side walls or guiding edge faces thereof to maintain proper relationship with the lower main feed roll O to hold the sprocket 3 tightly against the drive chain 6 at all points of the travel of said shaft R in said arcuate slot S to at all times keep the chain tight and in operative driving contact with all of the sprocket wheels 1, 2, 3, 4 and 5.

X designates a rod resting on, pressing against, supported by, and preferably connected to, one of the side bars of the frame D and receiving on its upper screw-threaded end portion a pair of adjusting and locking nuts $x$ and $x'$ to adjustably rigidly support the otherwise free end of a rigid arm Y mounted for free swinging movement on the rod or shaft Z and carrying an idler sprocket S. The screw-threaded upper end portion of rod X fits between the furcations of the bifurcated and free end of the arm Y which is located between the said units $x$ and $x'$.

Any slack or looseness in the chain 6 that may develop due to wear or stretching of the chain as the result of use or strain in use or for any reason may be taken up or eliminated by unscrewing the upper nut $x'$, which functions as a lock nut, then turning nut $x$ to move toward lock nut $x'$ to bear against the lower face of the free end of arm Y and force the same upward sufficiently to take up the slack, when the lock nut $x'$ will be turned to screw down on the rod X to bear against the arm Y with sufficient pressure to through it exert a jamming action against the nut $x$ to thus lock the nuts $x$ and $x'$ to the rod X in their newly adjusted position.

Such adjustment of the nuts $x$ and $x'$ to take up slack will only be necessary at quite long intervals, possibly once or twice a year, depending upon the extent of use and conditions of use of the particular machine.

The extreme lower end portion of rod X may rest in an annular collar or other part forming a cup or socket and welded or otherwise secured to the flange of the side bar of frame D, said lower end portion of rod X and said collar or socket being transversely drilled in registry to form or provide transverse registering bores to receive a cotterpin or similar means to definitely positively tie or connect the rod X to the side bar of the frame D.

The construction and operation as thus far described, excepting levers 7, are old and well known in the art as is also the provision of the reversing or clutch lever H keyed or otherwise suitably secured to the rod $h$ for reversing the direction of travel of the table or main conveyer belt I to unload the machine under certain conditions, one applicable form of drive from the main drive pulley A to the table or main conveyer I and the general arrangement broadly speaking being shown in Patent No. 1,246,976 granted to George M. Merwin November 20, 1917, or the patent to Charles E. Everett granted July 14, 1936, No. 2,047,410, the exact drive from the pulley A to the gear wheel M of the present application being shown and described in detail in application Ser. No. 515,756, for Drive mechanism for feed rolls, filed December 27, 1943, by me together with Paul C. Dellinger as joint inventors.

My invention resides as to its essential elements in the combining with the top and bottom main feed rolls Q and O and an endless chain or belt driving said rolls in proper opposite directions to feed the material between them to the chopper bar $d$ and cutter, of lever means connected to the upper main feed roll Q and so mounted, constructed and arranged that it will be engaged by another element moving under the influence of, or due to the pressure of, an increase in the thickness of the layer of material being fed and by its movement will positively move the roll Q away from the lower main feed roll O.

While this may be accomplished in various ways and with various forms, constructions and arrangements of levers and links, I prefer to accomplish it by the embodiment illustrated and wherein a lever 7 is swingably mounted on each end portion of the shaft or rod Z to swing through an arc, as well illustrated in Fig. 3, about the axis of said shaft or rod Z and close to and substantially parallel to the outer faces of the corresponding sides E of the cutter box and extend forwardly sufficiently so that their respective lower edge faces extend beyond the axis of the shaft V in the lowest position of the levers 7 and lie in the path of movement of the respective end portions of said shaft V as it moves upward in the slots W so as to be respectively engaged by the said collars $v$ on the said respective end portions of said shaft V after the same shall have moved a slight predetermined distance upward from its lowest position wherein said collars $v$ rest upon or adjacent to the bottom edge walls of the slots W. Said levers 7 preferably have forward lower edge portions 8 in each instance extending substantially horizontally when the levers 7 are in their lowest position, as shown in Figs. 1 and 3, constituting cam faces to be engaged by the corresponding collars $v$ on the corresponding end portions of the shaft V as the same rises and to slide endwise over said collars $v$ as the rising movement of said levers and said shaft V progresses.

While it is preferred to employ the little sleeve bearings or collars $v$ to overcome friction between the end portions of the shaft V and the walls of slots W the same end may be accomplished in other ways, and said sleeves are in essence part of the shaft V and are to be so considered or might be eliminated or turned with the shaft V and it would operate, though in the absence of other anti-friction means there would be rapid wear.

A link means, which may be but need not necessarily be rigid, such as the link 9, serves to connect the lever 7 and the shaft R of the upper roll Q, such link connecting means being provided on each side of the cutter box between each end of the shaft R and each corresponding lever 7. Where rigid links such as 9 are used the same will be pivotally connected by their upper end portions, as by a pivot 10, to the levers 7 respectively, the point of attachment of each link 9 to its corresponding lever 7 preferably being at a distance from the front or free end of said lever approximately equal to two-fifths of the distance between the axis of shaft or rod Z and the extreme forward or free end of the said lever, and the ends or end portions respectively of the shaft R will be journaled in the lower end portions of the respective links 9.

A sprocket wheel 1 is keyed to shaft K between the side E of the cutter box and gear L which is keyed to said shaft and driven by gear M. A sprocket wheel 2 is keyed to shaft P, and a sprocket wheel 3 is keyed to the shaft R, an idler sprocket 4 being mounted to turn about the axis of the shaft or rod Z either with the shaft Z or freely thereon and a similar idler sprocket 5 is mounted to turn freely about a stub-shaft or pin extending through the tension arm Y and extending across or spanning a slot or a continuation of the furcation therein, said idler sprocket 5 being disposed in such slot or furcation.

All of said sprockets 1, 2, 3, 4 and 5 are located on the same side of the cutter box, preferably have substantially parallel axes, and preferably are disposed in the same vertical plane extending parallel to the side of the cutter box, and an endless drive sprocket chain or endless driving band 6 extends from the front portion of the movable sprocket 3 of the movable upper main feed roll Q back over the rear portion of the idler sprocket 4, forward over the upper and front portion of idler sprocket 5, downward over the front and lower face of sprocket 1 and back and upward around the lower and rear face of sprocket 2 and then upward and forward over the front portion of sprocket 3 to complete the endless band and is driven by sprocket wheel 1 in the direction of the arrow to rotate the upper and lower main feed rolls Q and O in the directions as indicated by the arrows to feed the material rearward to the cutter bar d and cutter knives as well shown in Figures 1 and 3.

Such an arrangement of chain drive for the feed rolls has many advantages on the ground of its simplicity, but, in the absence of some provision to positively pull the upper feed roll Q up when the thickness of the layer of material being fed increases, has been found defective by reason of the fact that the torque or pull of the chain 6 downward on the sprocket 3 as it passes around said sprocket and between said sprocket and the sprocket 2 fights the thrust of the material tending to shove the roll Q upward, opposing the free movement upward of the roll Q with consequent steady progressive increase in the density of the material passing between the feed rolls O and Q and a consequent progressive increase in the power required to rotate the said feed rolls and thus a consequent progressive increase in the strain exerted upon the drive chain 6, resulting in the machine running heavy, requiring excessive power, and frequent stops for repairs due to choking of the machine, breakage of the chain, and excessive wear on the various parts.

By the combination of the parts in accordance with my present invention the drive chain 6 is relieved of this excessive strain and its tendency to roll the upper feed roll Q downward as the increase in thickness of material being fed opposes its free rotation is eliminated or neutralized by the action of the link and lever in positively raising the upper roll Q as the increased thickness of material passes under supplementary upper roll U and before it reaches the main upper feed roll Q.

The operation is believed to be very graphically illustrated in Figure 3 wherein: the initial position $a$ is shown in solid lines illustrative of the collars $v$ on the end portions of the shaft V, the end of the shaft R, the link 9, the lever 7 and the position of the upper apron $t$; wherein the position $a'$ of the shaft V and of the upper apron $t$ are indicated by a dot and dash line when the supplementary upper forward roll U has moved to the limit of its independent upward movement prior to initiating movement of the lever 7, link 9 and shaft R to accommodate limited variations in the thickness of the layer; wherein intermediate positions of the parts at points $b$ and $c$ respectively are respectively indicated by multiple dot and dash and by short dash lines; and wherein the position of the parts as at $d$ after the peak of the load has passed the forward or supplementary upper feed roll U and before it has passed between the main feed rolls O and Q is indicated by the dotted lines.

While these several positions illustrated have been selected rather arbitrarily simply for illustration, by way of comparison, of the various relative positions of the parts throughout their possible range of movement during the operation of the device, they serve to clearly illustrate that the upper unitary feed means has full freedom of movement so that it may float on the material being fed and at all times engage it and efficiently feed it rearward to the cutting or processing apparatus. The forward end is free to rise to a limited extent initially independently of the rear end and is free at any time to drop all the way or merely partially entirely independent of the rear end. The rear end is free to rise independently of the front end and to fall independently of the front end if the latter be already down beyond or to the top of its extreme upward independent position or to fall independently of the front end until the levers 7 contact the respective collars $v$ on the end portions respectively of the shaft V.

From the foregoing it follows that the unitary upper feed means is free to at all times shift its position to conform to or to follow from front to rear undulations of the surface of the layer of material being fed so as to at all times be in contact therewith for substantially the full length of the unitary upper feed means and that excessive strains upon the drive chain 6 will be avoided, clogging of the machine will be avoided, no substantial increase of resistance to the free rotation of the main feed rolls O and Q can occur in the absence of the introduction of some unusual hard substance too large to pass through the maximum opening between the rolls O and Q, and the machine will run light, requiring relatively little power.

The unitary upper feed means comprises the upper main feed or rear roll Q, the supplementary or front upper feed roll U, the shaft R on which roll Q is mounted for rotation therewith, the shaft V on which the roll U is mounted for rotation therewith, a pair of rigid preferably metal bars T in the respective end portions of which the respective end portions of the respective shafts R and V are journaled, and, preferably, an endless apron which may be made of a plurality of thin metal plates linked together to constitute an endless flexible band and of a length substantially corresponding to the length of the rolls Q and U, that is to say of such length that the apron will travel freely about said rolls Q and U between the opposed faces of the sides E of the cutter box, and these plates may be formed near their respective end portions with notches or holes to receive the driving teeth extending radially from the peripheral faces of the respective end portions of the respective rolls Q and U.

However, while the provision of such an upper feed apron as t is preferred, and while some sort of apron as a part of the unitary upper feed means and acting upon the upper part of the layer of material being fed is preferred, nevertheless it is not essential to my invention that an apron or endless band be provided as a part of the unitary upper feed means, which may vary considerably as to its construction and type so long as it is of such construction and so mounted and combined with the levers 7 as to function in the manner substantially as described, the drag or torque or pull of the chain 6 forcing the rear end portion of said means toward the roll O until counteracted by the upward pull of the levers 7, the action of the latter being opposed to the former, and the one offsetting the other.

Also, while it is preferred to mount the levers 7 to extend forward from their point of pivotal mounting, this is not essential, nor is it essential that their point of pivotal mounting shall be at a higher level than the shaft V or the shaft R, nor is it essential that it shall have a distinct substantially horizontal edge face such as 8, it being sufficient if there be provided suitable lever means however mounted and of whatever construction so long as they combine with the shafts R and V to function in the manner and to achieve the objects herein set forth.

I claim:

1. A material treating machine comprising a conveyer, means for driving said conveyer, and a lower main feed roll to receive material from said conveyer, in combination with an unitary upper feed means comprising a pair of rigid bars, a rotatable main upper feed roll mounted upon a rotatable shaft having its respective end portions journaled in the respective rear end portions of said bars, a supplementary rotatable upper feed roll mounted upon a shaft having its respective end portions received by the respective front end portions of said bars and extending laterally outwardly therefrom, and an endless band extending about said upper rolls and driving the supplementary roll from the main upper feed roll, guide means confining the bodily movements of the upper main feed roll to a definite path with relation to the lower main feed roll; guide means for the shaft of said supplementary roll, a pair of levers respectively pivotally mounted to swing in substantially vertical paths about fixed points and respectively extending above and in the respective paths of vertical movement of the respective end portions of the shaft of said supplementary roll, rigid means respectively journaling the respective end portions of the shaft of the upper main roll and respectively pivotally connected to portions of the respective levers, driven wheels respectively mounted on and to turn with the respective shafts of said lower and upper main feed rolls, and means including an endless band extending between and engaging both of said wheels for driving the same in opposite directions throughout the range of bodily movement of the upper main feed roll with relation to the lower main feed roll.

2. A material treating machine comprising a conveyer, means for driving said conveyer, and a lower main feed roll to receive material from said conveyer, in combination with an unitary upper feed means comprising a pair of rigid bars, a rotatable main upper feed roll mounted upon a shaft having its respective end portions received by the respective rear end portions of said bars and extending laterally outwardly therefrom, and means spanning the front end portions of said bars to engage and rise and fall with the lengthwise undulations of the upper face of the layer of material moving with said conveyer and having portions extending laterally outwardly from said respective bars, guide means for the main upper feed roll, guide means for said respective laterally projecting portions, a pair of levers respectively pivotally mounted to swing in substantially vertical paths about fixed points and respectively extending above and in the respective paths of vertical movement of said laterally extending portions to be engaged and lifted thereby as the front end of said unitary feed means moves upward, means respectively connecting the respective end portions of the shaft of the upper main roll to the respective levers to pull said shaft upward as said levers swing upward, driven wheels operatively connected with said lower and upper main feed rolls, and means including an endless band extending between and in driving engagement with both of said wheels for driving the same in opposite directions to rotate said rolls in opposite directions throughout the range of bodily movement of the upper main feed roll with relation to the lower main feed roll.

3. A material treating machine comprising a conveyer, means for driving said conveyer, and a lower main feed roll, in combination with an unitary upper feed means comprising a pair of rigid bars, a main upper roll mounted upon a shaft having its respective end portions journaled in the respective rear end portions of said bars and extending laterally outwardly therefrom, and means spanning the front end portions of said bars to engage and rise and fall with the lengthwise undulations of the upper face of the layer of material on said conveyer and having portions extending laterally outwardly from said respective bars, guide means for the upper main feed roll, a pair of levers respectively pivotally mounted to swing in substantially vertical paths about fixed points and respectively extending above and in the respective paths of travel vertically of said laterally extending portions, means respectively connecting the respective end portions of the shaft of the upper main feed roll to medial portions of the respective levers to pull said shaft upward as said levers swing upward, driven wheels operatively connected respectively with the lower and upper main feed rolls, and means including an endless band extending between and in driving engagement with both of said wheels for driving the same in opposite directions to rotate said rolls in opposite directions throughout the range of bodily movement of said upper main feed roll with relation to said lower feed roll.

4. A material treating machine comprising a conveyer, means for driving said conveyer, and a lower main feed roll to receive material from said conveyer, in combination with a pair of rigid bars, a main upper feed roll mounted on a shaft having its respective end portions journaled in the respective rear end portions of said bars, guide means for said shaft, a supplementary upper feed roll mounted upon a shaft having its respective end portions journaled in the respective front end portions of said bars, a lever pivotally mounted to swing in a vertical path about a fixed point and extending above and in the path of vertical movement of the shaft of said supplementary upper feed roll, means connecting the shaft of the upper main feed roll to said lever to pull said shaft upward as said lever swings upward, driven wheels respectively operatively connected to said lower and upper main feed rolls, and means including an endless band extending between and in driving engagement with both of said wheels for driving the same in opposite directions to rotate said rolls in opposite directions throughout the range of bodily movement of the upper main feed roll with relation to the lower main feed roll.

5. A material treating machine comprising a lower feed roll mounted to rotate about a fixed axis, a movable upper feed roll mounted for rotation about an axis movable toward and away from, and extending substantially parallel to, said lower main feed roll and including a shaft about the axis of which said upper feed roll rotates, and means for directing a mass of material to be treated to said rolls, in combination with a movable element to be engaged by the top of said mass in advance of said rolls and to move with a rising and falling movement in accordance with, and as required by, the variations in the thickness of said mass, a lever pivotally mounted at a fixed point of said machine for swinging movement in a vertical plane and extending above said element and in its path of travel to be engaged thereby as the same rises and falls to have swinging movement in accordance with the rising and falling movements of said element, rigid link means connected to said upper feed roll and said lever for pulling said upper feed roll up away from, and pushing it down toward, said lower feed roll in accordance with the swinging movement of said lever, driven wheels connected respectively with said respective rolls to respectively turn therewith, and means including an endless band extending between and in driving engagement with both of said wheels for driving the same in opposite directions throughout the range of bodily movement of the upper main feed roll with relation to the lower main feed roll and in the normal from front to rear feed of the material between said rolls exerting a downward pull on the upper feed roll in opposition to the upward pull of said connecting means.

6. A material treating machine comprising a lower feed roll mounted to rotate about a fixed axis, a movable upper feed roll mounted for rotation about an axis movable toward and away from, and extending substantially parallel to, said lower main feed roll and including a shaft about the axis of which said upper feed roll rotates, and means for directing a mass of material to be treated to said rolls, in combination with a movable element to be engaged by the top of said mass in advance of said rolls and to move with a rising and falling movement in accordance with, and as required by, the variations in the thickness of said mass, a lever pivotally mounted at a fixed point of said machine for swinging movement in a vertical plane and extending above said element and in its path of travel to be engaged thereby as the same rises and falls to have swinging movement in accordance with the rising and falling movements of said element, means connected to said upper feed roll and said lever for pulling said upper feed roll up away from said lower feed roll in accordance with the swinging movement of said lever, driven wheels connected respectively with said respective rolls to respectively turn therewith, and means including an endless band extending between and in driving engagement with both of said wheels for driving the same in opposite directions throughout the range of bodily movement of the upper main feed roll with relation to the lower main feed roll and in the normal from front to rear feed of the material between said rolls exerting a downward pull on the upper feed roll in opposition to the upward pull of said connecting means.

MILES L. SENSENIG.